United States Patent [19]

Imai et al.

[11] Patent Number: 4,625,003

[45] Date of Patent: Nov. 25, 1986

[54] CATALYST COMPONENT FOR POLYMERIZATION OF OLEFINS (P-1026)

[75] Inventors: Masafumi Imai; Tadashi Yamamoto; Hiroyuki Furuhashi; Hiroshi Ueno; Naomi Inaba, all of Saitama, Japan

[73] Assignee: Toa Nenryo Kogyo Kabushiki Kaisha, Tokyo, Japan

[21] Appl. No.: 771,392

[22] Filed: Aug. 30, 1985

Related U.S. Application Data

[62] Division of Ser. No. 642,022, Aug. 20, 1984, Pat. No. 4,552,858.

[30] Foreign Application Priority Data

Aug. 30, 1985 [JP] Japan .................................. 60-157092

[51] Int. Cl.$^4$ .............................................. C08F 4/64
[52] U.S. Cl. .................................... 526/119; 526/122; 526/124; 526/125; 526/351
[58] Field of Search ............... 526/124, 125, 127, 128, 526/119, 122

[56] References Cited

U.S. PATENT DOCUMENTS

| | | | |
|---|---|---|---|
| 4,115,319 | 9/1978 | Luciani et al. | 526/124 |
| 4,144,390 | 3/1979 | Derroitte et al. | 526/124 |
| 4,159,256 | 6/1979 | Sakurai et al. | 526/124 X |
| 4,159,963 | 7/1979 | Sakurai et al. | 526/124 X |
| 4,159,965 | 7/1979 | Sakurai et al. | 526/124 |
| 4,218,339 | 8/1980 | Zucchini et al. | 526/124 X |
| 4,242,479 | 12/1980 | Yokota et al. | 526/124 |
| 4,250,287 | 2/1981 | Matlack | 526/125 |
| 4,324,690 | 4/1982 | Karayannis et al. | 526/124 X |
| 4,330,650 | 5/1982 | Sakurai et al. | 526/125 X |
| 4,431,568 | 2/1984 | Miya et al. | 526/124 |
| 4,464,478 | 8/1984 | Scata et al. | 526/125 X |
| 4,472,521 | 9/1984 | Band | 526/175 X |

FOREIGN PATENT DOCUMENTS

| | | |
|---|---|---|
| 49467 | 4/1982 | European Pat. Off. |
| 155205 | 12/1971 | Japan |
| 98076 | 8/1977 | Japan |
| 43094 | 4/1978 | Japan |
| 168308 | 11/1980 | Japan |

*Primary Examiner*—Patrick P. Garvin
*Attorney, Agent, or Firm*—M. B. Kurtzman

[57] ABSTRACT

A titanium halide containing catalyst component for polymerization of olefins which is prepared by reacting a magnesium hydrocarbyloxide with a silicon compound having at least one hydrogen-silicon bond, contacting the reaction product with an electron donor compound, contacting the resulting contact product two or more times with a titanium halide and between one of the multiple titanium halide contacts, contacting the titanium halide contacted solid with a halide of an element selected from the group consisting of elements of Groups IIIa, IVa, and Va of the Periodic Table of elements.

9 Claims, No Drawings

CATALYST COMPONENT FOR POLYMERIZATION OF OLEFINS (P-1026)

This is division, of application Ser. No. 642,022 filed 8/20/84 and now U.S. Pat. No. 4,552,858.

DESCRIPTION OF THE INVENTION

1. Field of Technology

The present invention relates to a catalyst component for polymerization of olefins. More particularly, the invention relates to (a) a catalyst component which provides olefin polymers having a high stereoregularity and a high bulk density in high yields (b) an olefin polymerization catalyst system comprising the titanium halide containing catalyst component and an organometal cocatalyst, and (c) the process of polymerizing olefins in the presence of the catalyst system.

2. Background Technology

Heretofore, it has been known that a contact product of a halogen-free magnesium compound and a titanium compound is useful as a catalyst component for the polymerization of olefins. However, it is low in catalytic performance, and attempts have been made for improvement. Such attempts include a process in which $Mg(OR)_2$ is contacted with titanium tetrahalide in the presence of a halogenated silane represented by $SiX_pR_{4-p}$ (X=halogen, R=hydrocarbyl radical) or in the presence of said halogenated silane and an electron donor compound (Japanese Patent Laid-open No. 98076/1977), a process in which a magnesium compound having the Mg-O-R linkage is contacted with a halogenating agent such as a silicon compound represented by the formula $X_mSiR_n$ (X and R being as defined above) in the presence of an electron donor compound (Japanese Patent Laid-open No. 43094/1978), a process in which the solid reaction product of a halogenated aluminum, an organic compound having the Si-O bond, and magnesium alcoholate is contacted with a tetravalent titanium compound having at least one halogen atom (Japenese Patent Laid-open No. 78287/1978), a process in which the reaction product of a magnesium compound, titanium compound, and silicon compound is contacted with at least one kind of halogenated aluminum compound (Japanese Patent Laid-open No. 155205/1981).

The catalyst components obtained according to the above-mentioned processes, however, are poor in catalytic activity and stereoregularity and provide polymers having a low bulk density. In addition to the above-mentioned catalyst components, there is known one which is obtained by contacting a magnesium compound, an electron donor compound, a silicon compound having the Si-H bond, and a titanium halide compound all together (Japanese Patent Laid-open No. 92009/1982). According to this process, the magnesium compound is essentially a magnesium halide and the silicon compound and titanium halide are used simultaneously for contacting. Therefore, the resulting product is not necessarily satisfactory.

SUMMARY OF THE INVENTION

In order to produce from a halogen-free magnesium compound a catalyst component which can be made into a catalyst which exhibits high stereoregularity and high catalytic activity and provides olefin polymers having a high bulk density, the present inventors carried out extensive researches, which led to the findings that the object can be achieved with a solid substance obtained by reacting a magnesium hydrocarbyloxide with a silicon compound having the hydrogen-silicon bond, contacting the reaction product with an electron donor compound, contacting the resulting contact product two or more times with a titanium halide and between at least one of the multiple titanium halide contacting steps, contacting the titanium halide contacted solid with a halide of an element in Groups IIIa, IVa and Va of the Periodic Table. The present invention has been completed based on these findings.

The essence of this invention resides in a catalyst component for polymerization of olefins which is prepared by reacting a magnesium hydrocarbyloxide with a silicon compound having the hydrogen-silicon bond, contacting the reaction product with an electron donor compound, and contacting the resulting contact product with a titanium halide more than once and with a halide of an element selected from the group consisting of elements of Groups IIIa, IVa and Va of the periodic table of elements, in the interval of said contacting with a titanium halide.

RAW MATERIALS FOR CATALYST COMPONENT

The raw materials used for preparing the catalyst component of this invention are described below.

(A) Magnesium Hydrocarbyloxide

The magnesium hydrocarbyloxide used in this invention is represented by the formula Mg(OR)(OR'), wherein R and R' are alkyl, alkenyl, cycloalkyl, aryl, or aralkyl groups having 1 to 20 carbon atoms, preferably 1 to 10 carbon atoms, and R and R' may be the same or different.

These compounds include, for example, $Mg(OCH_3)_2$, $Mg(C_2H_5)_2$, $Mg(OCH_3)(OC_2H_5)$, $Mg(Oi-C_3H_7)_2$, $Mg(OC_3H_7)_2$, $Mg(OC_4H_9)_2$, $Mg(Oi-C_4H_9)_2$, $Mg(OC_4H_9)(O-iC_4H_9)$, $Mg(OC_4H_9)(Osec-C_4H_9)$, $Mg(OC_6H_{13})_2$, $Mg(OC_8H_{17})_2$, $Mg(OC_6H_{11})_2$, $Mg(OC_6H_5)_2$, $Mg(OC_6H_4CH_3)_2$, and $Mg(OCH_2C_6H_5)_2$.

These magnesium hydrocarbyloxides should preferably be dried before use, and more preferably be dried with heating under reduced pressure. These magnesium hydrocaryloxides may be obtained commercially or may be synthesized according to the known methods.

These magnesium hydrocarbyloxides may be contacted with an inorganic or organic inert solid substance prior to use.

Suitable inorganic solid substances include metal compounds in the form of sulfate, hydroxide, carbonate, phosphate, or silicate. Examples of such compounds include $Mg(OH)_2$, $BaCO_3$, and $Ca_3(PO_4)_2$.

Suitable organic solid substances include low-molecular aromatic hydrocarbons such as durene, anthracene, napthalene, and diphenyl. They also include high-molecular compounds such as polyethylene, polypropylene, polyvinyl toluene, polystyrene, polymethyl methacrylate, polyamide, polyester, and polyvinyl chloride.

(B) Silicon Compound

The silicon compound used in this invention may be any compound having the hydrogen-silicon bond. It is represented by the formula $H_mR_nSiX_r$, wherein R is (1) a hydrocarbon group, (2) R'O-(R' is a hydrocarbon group), (3) $R^2R^3N$- ($R^2$ and $R^3$ are hydrocarbon groups), or (4) R⁴COO- (R⁴ is a hydrogen atom or hydrocarbon group); X is a halogen atom; and m is 1 to 3, $0 \leq r < 4$, and $m+n+r=4$. When n is greater than 1, R may be the same or different.

The hydrocarbon groups represented by R, $R^1$, $R^2$, $R^3$, and $R^4$ include alkyl, alkenyl, cycloalkyl, aryl, and aralkyl groups of carbon number 1 to 16. The alkyl group includes, for example, methyl, ethyl, propyl, n-butyl, isobutyl, n-hexyl, n-octyl, 2-ethylhexyl, and n-decyl. The alkenyl group includes, for example, vinyl, allyl, isopropenyl, propenyl, and butenyl. The cycloalkyl group includes, for example, cyclopentyl and cyclohexyl. The aryl group includes, for example, phenyl, tolyl, and xylyl. The aralkyl group includes, for example, benzyl, phenetyl, and phenylpropyl.

Preferable among them are lower alkyl groups such as methyl, ethyl, propyl, isopropyl, n-butyl, isobutyl, and t-butyl, and aryl groups such as phenyl and tolyl.

X denotes halogen atoms such as chlorine, bromine, and iodine. The preferred halogen is chlorine.

The silicon compounds are exemplified by $HSiCl_3$, $H_2SiCl_2$, $H_3SiCl$, $HCH_3SiCl_2$, $HC_2H_5SiCl_2$, $H(t-C_4H_9)SiCl_2$, $HC_6H_5SiCl_2$, $H(CH_3)_2SiCl$, $H(i-C_3H_7)_2SiCl$, $H_2C_2H_5SiCl$, $H_2(n-C_4H_9)SiCl$, $H_2(C_6H_4CH_3)SiCl$, $HSi(CH_3)_3$, $HSiCH_3(OCH_3)_2$, $HSiCH_3(OC_2H_5)_2$, $HSi(OCH_3)_3$, $(C_2H_5)_2SiH_2$, $HSi(CH_3)_2(OC_2H_5)$, $HSi(CH_3)_2[N(CH_3)_2]$, $HSiCH_3(C_2H_5)_2$, $HSiC_2H_5(OC_2H_5)_2$, $HSiCH_3[N(CH_3)_2]_2$, $C_6H_5SiH_3$, $HSi(C_2H_5)_3$, $HSi(OC_2H_5)_3$, $HSi(CH_3)_2[N(C_2H_5)_2]$, $HSi[N(CH_3)_2]_3$, $C_6H_5CH_3SiH_2$, $C_6H_5(CH_3)_2SiH$, $(n-C_3H_7)_3SiH$, $HSiCl(C_6H_5)_2$, $H_2Si(C_6H_5)_2$, $HSi(C_6H_5)_2CH_3$, $(n-C_5H_{11}O)_3SiH$, $HSi(C_6H_5)_3$, and $(n-C_5H_{11})_3SiH$. Another example of the compounds not covered by the above formulas include $(ClCH_2CH_2O)_2CH_3SiH$, $HSi(OCH_2CH_2Cl)_3$, $[H(CH_3)_2Si]_2O$, $[H(CH_3)_2Si]_2NH$, $(CH_3)_3SiOSi(CH_3)_2H$, $[H(CH_3)_2Si]_2C_6H_4$ $[H(CH_3)_2SiO]_2Si(CH_3)_2$, $[(CH_3)_3SiO]_2SiHCH_3$, $[(CH_3)_3SiO]_3SiH$, and

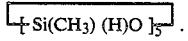

Preferable among these halogenated silicon compounds are those which are represented by the formula in which R is a hydrocarbon, n is 0 to 2, and r is 1 to 3. They are $HSiCl_3$, $H_2SiCl_2$, $H_3SiCl$, $HCH_3SiCl_2$, $HC_2H_5SiCl_2$, $H(t-C_4H_9)SiCl_2$, $HC_6H_5SiCl_2$, $H(CH_3)_2SiCl$, $H(i-C_3H_7)_2SiCl$, $H_2C_2H_5SiCl$, $H_2(n-C_4H_9)SiCl$, $H_2(C_6H_4CH_3)SiCl$, and $HSiCl(C_6H_5)_2$. Most preferable among them are $HSiCl_3$, $HCH_3SiCl_2$, and $H(CH_3)_2SiCl$. Also preferable are those which are represented by the formula in which $r=0$, for example, $HSi(C_2H_5)_3$ and $HSiCh_3(OC_2H_5)_2$. Especially preferred among the silicon compounds is $HSiCl_3$.

(C) Electron Donor Compound

The electron donor compound used in this invention includes carboxylic acids, carboxylic anhydrides, carboxylic esters, carboxylic acid halides, alcohols, ethers, ketones, amines, amides, nitriles, aldehydes, alcoholates, phosphoamides, thioethers, thioesters, and carbonic esters, and phosphorus, arsenic, and antimony compounds in which these atoms are bonded to an organic group through a carbon or oxygen. Preferable among them are carboxylic esters, carboxylic acid anhydrides, carboxylic acid halides, alcohols, and ethers.

Examples of carboxylic esters include butyl formate, ethyl acetate, butyl acetate, ethyl acrylate, ethyl butyrate, isobutyl isobutyrate, methyl methacrylate, diethyl maleate, diethyl tartrate, ethyl cyclohexanecarbonate, ethyl benzoate, ethyl p-methoxybenzoate, methyl p-methylbenzoate, ethyl p-tert-butylbenzoate, dibutyl phthalate, diallyl phthalate, and ethyl alpha-naphthoate. They are not limitative. Preferable among them are alkyl esters of aromatic carboxylic acid, particularly $C_{1-8}$ alkyl esters of benzoic acid or nucleus-substituted benzoic acid such as p-methylbenzoic acid and p-methoxy benzoic acid.

Examples of the carboxylic anhydride include aliphatic monocarboxylic anhydrides such as acetic anhydride, propionic anhydride, butyric anhydride, valeric anhydride, and caproic anhydride; aliphatic olefinmonocarboxylic anhydrides such as acrylic anhydride, crotonic anhydride, and methacrylic anhydride; alicyclic carboxylic anhydrides such as cyclohexanemonocarboxylic anhydride, cyclohexenemonocarboxylic anhydride, cis-1,2-cyclohexanedicarboxylic anhydride, and cis-4-cyclohexene-1,2-dicarboxylic anhydride; aromatic monocarboxylic anhydrides such as benzoic anhydride, p-toluylic anhydride, p-ethylbenzoic anhydride, and p-methoxybenzoic anhydride; and aromatic dicarboxylic anhydrides such as phthalic anhydride.

Examples of the carboxylic acid halides include aliphatic monocarboxylic acid halides (acid chlorides such as acetyl chloride, propionyl chloride, n-butylyl chloride; and acid bromides such as acetyl bromide and n-butyl bromide; and acid iodides such as acetyl iodide and n-butyl iodide), aliphatic monoolefincarboxylic acid halides (acid chlorides such as acryl chloride, crotonyl chloride, and methacryl chloride; acid bromides such as acryl bromide and methacryl bromide; and acid iodides such as acryl iodide and methacryl iodide), alicyclic carboxylic acid halides (cyclohexanecarboxylic acid chloride, cis-4-methylcyclohexanecarboxylic acid chloride, 1-cyclohexenecarboxylic acid chloride, cyclohexanecarboxylic acid bromide, and cis-4-methylhexenecarboxylic acid bromide), aromatic monocarboxylic acid halides (acid chlorides such as benzoyl chloride, p-toluic acid chloride, p-ethylbenzoic acid chloride, and p-methoxybenzoic acid chloride; acid bromides such as benzoyl bromide; and acid iodides such as benzoyl iodide), and aromatic dicarboxylic acid halides such as phthalic acid dichloride.

The alcohols are represented by the formula ROH, wherein R is an alkyl, alkenyl, cycloalkyl, aryl, or aralkyl group of carbon number 1 to 12. Examples of the alcohols include methanol, ethanol, propanol, isopropanol, butanol, isobutanol, pentanol, hexanol, octanol, 2-ethylhexanol, cyclohexanol, benzyl alcohol, allyl alcohol, phenol, cresol, xylenol, ethylphenol, isopropylphenol, p-t-butylphenol, n-octylphenol, and naphthol.

The ethers are represented by the formula ROR', wherein R and R' are alkyl, alkenyl, cycloalkyl, aryl, or aralkyl groups of carbon number 1 to 12, and R and R' may be the same or different. Examples of the ethers include diethyl ether, diisopropyl ether, dibutyl ether, diisobutyl ether, diisoamyl ether, di-2-ethylhexyl ether, diallyl ether, ethyl allyl ether, butyl allyl ether, diphenyl ether, anisole, and ethyl phenyl ether.

(D) Titanium Halide

The titanium halide used in this invention includes tetravalent titanium halides such as titanium tetrachloride, trichloroethoxytitanium, dichlorodibutoxytitanium, and dichlorodiphenoxytitanium. Most preferable is titanium tetrachloride.

(E) Halide of element of Group IIIa, IVa, and Va

The halide of an element selected from the elements in Group IIIa, IVa, and Va of the periodic table of elements (referred to as metal halide hereinafter) includes, for example, chlorides, fluorides, bromides, and iodides of B, Al, Ga, In, Tl, Si, Ge, Sn, Pb, As, Sb, and Bi. Preferable among them are $BCl_3$, $BBR_3$, $BI_3$, $AlCl_3$, $AlBr_3$, $AlI_3$, $GaCl_3$, $GaBr_3$, $InCl_3$, $TiCl_3$, $SiCl_4$, $SnCl_4$, $SbCl_5$, and $SbF_5$. Among these $SiCl_4$, $SnCl_4$, $AlCl_3$ and $BCl_3$ are especially preferred.

PREPARATION OF CATALYST COMPONENT

The catalyst component of this invention is prepared by reacting a magnesium hydrocarbyloxide (component A) with the silicon compound containing at least one H-Si bond (component B), contacting the reaction product with an electron donor compound (component C), and contacting the resulting contact product with a titanium halide (component D) more than once (i.e., two or more times) and with a metal halide (component E) in the interval of said contacting with a titanium halide (i.e., between at least two consecutive titanium halide treatments). The process is described below.

(1) Reaction of Magnesium Alkoxide with Silicon Compound

The reaction of a magnesium hydrocarbyloxide (component A) with the silicon compound containing at least one H-Si bond (component B) is accomplished by contacting the two components with each other. The contacting can be accomplished by mixing, stirring or mechanically copulverizing the two compounds in the presence or absence of a hydrocarbon. Preferably, the two components should be mixed and stirred in a hydrocarbon.

The preferred hydrocarbon is a saturated aliphatic, saturated alicyclic, or aromatic hydrocarbon of carbon number 6 to 12 such as hexane, heptane, octane, cyclohexane, benzene, toluene, and xylene.

One mol of component A is contacted with 0.5 to 10 mol, preferably 1 to 5 mol of component B. Usually, the contacting is performed at 0° to 200° C. for 0.5 to 100 hours. More than one kind each of component A and component B may be used.

The hydrocarbon may be used in any amount; but it should preferably be less than 100 ml for 1 g of component A.

In the case where a halogenated silicon compound is used as component B, a gas is formed when component A is contacted with component B. This indicates that the reaction is taking place. The quantity of silicon atom in the reaction product, which is insoluble in an inert solvent, particularly n-hexane or n-heptane, at 65° C., is more than 8 wt %.

The contact product of component A and component B is separated from the reaction system, and is used for the subsequent contacting. If necessary, it may be washed with an inert hydrocarbon such as one which is used in the contacting of component A and component B, prior to the subsequent contacting. This washing may be carried out with heating.

(2) Contacting with Electron Donor Compound

The contacting of the reaction product obtained in the above step (1) with an electron donor compound (component C) may be accomplished by mixing and stirring them together in the presence or absence of an inert hydrocarbon, or by mechanically copulverizing them. The inert hydrocarbon includes hexane, heptane, octane, cyclohexane, benzene, toluene, and xylene.

The contacting by mechanical copulverization should be carried out at 0° to 100° C. for 0.1 to 100 hours. The contacting by mere stirring should be carried out at 0° to 150° C. for 0.5 to 10 hours.

The electron donor compound is used in an amount of 0.01 to 10 gram mol, particularly 0.05 to 1 gram mol, for 1 gram atom of magnesium in the reaction product of magnesium alkoxide and silicon compound.

(3) Contacting with a Titanium Halide

The contact product obtained in the above step (2) is then contacted two or more times with a titanium halide (component D). The two components [i.e., the reaction product of step (2) and the titanium halide] may be contacted with each other as such; but it is preferable that they are mixed and stirred in a hydrocarbon. The hydrocarbon includes hexane, heptane, octane, cyclohexane, benzene, toluene, and xylene.

Component D is used in an amount more than 0.1 gram mol, particularly 1 to 50 gram mol, for 1 gram atom of magnesium in the contact product.

The contacting should be carried out at 0° to 200° C. for 0.5 to 20 hours, and preferably at 60° to 150° C. for 1 to 5 hours.

The hydrocarbon is used in such amount that the contact product is 10 to 300 g for 1 liter of the liquid substance (hydrocarbon and liquid component D).

The second and subsequent contacting with component D is accomplished in the same manner as mentioned above after separation of the halogenated hydrocarbon used in the contacting with it which is mentioned below.

(4) Contacting with the Metal Halide

The contacting with a metal halide (component E), which is carried out at the interval of two or more contacts with component D, is accomplished by contacting the solids separated from component D used in the above step (3) with component E.

The solids and component E may be contacted with each other as such or in a hydrocarbon. The contacting may be accomplished by mechanical copulverizing or mixing and stirring.

Component E is used in an amount of more than 0.1 mol, preferably 0.5 to 200 mol, for 1 gram atom of magnesium in the solid. The contacting is accomplished at 0° to 200° C. for 0.1 to 15 hours, preferably 25° to 90° C. for 0.5 to 5 hours.

The solid substance obtained as mentioned above is washed, if required, with an inert hydrocarbon such as hexane, heptane, octane, cyclohexane, benzene, toluene, and xylene, followed by drying, whereby there is obtained the catalyst component of this invention.

The catalyst component of this invention is powder having a specific surface area of 50 to 650 $m^2/g$ as measured by BET method at the adsorption temperature of liquid nitrogen, a pore volume of 0.05 to 0.40 cc/g, and a narrow particle size distribution.

Catalyst for Polymerization of Olefin

The titanium containing solids catalyst component of this invention is combined with an organoaluminum compound to provide a catalyst for homopolymerization of an olefin or for copolymerization of an olefin and other olefin.

Organoaluminum Compound

The organoaluminum compound to be combined with the catalyst component is one which is represented by the formula $R_nAlX_{3-n}$, wherein R is an alkyl group or aryl group, X is a halogen atom, alkoxy group, or hydrogen atom, n is an arbitrary number in the range of $1 \leq n \leq 3$. Preferred ones are alkyl aluminum compounds and a mixture thereof or complex thereof having 1 to 18 carbon atoms, preferably 2 to 6 carbon atoms, such as trialkyl aluminum, dialkyl aluminum monohalide, monoalkyl aluminum dihalide, alkyl aluminum sesquihalide, dialkyl aluminum monoalkoxide, and dialkyl aluminum monohydride. Examples of such compounds include trialkyl aluminum such as trimethyl aluminum, triethyl aluminum, tripropyl aluminum, triisobutyl aluminum and trihexyl aluminum; dialkyl aluminum monohalide such as dimethyl aluminum chloride, diethyl aluminum chloride, diethyl aluminum bromide, diethyl aluminum iodide, and diisobutyl aluminum chloride; monoalkyl aluminum dihalide such as methyl aluminum dichloride, ethyl aluminum dichloride, methyl aluminum dibromide, ethyl aluminum dibromide, ethyl aluminum diiodide, and isobutyl aluminum dichloride; alkyl aluminum sesquihalide such as ethyl aluminum sesquichloride; dialkyl aluminum monoalkoxide such as dimethyl aluminum methoxide, diethyl aluminum ethoxide, diethyl aluminum phenoxide, dipropyl aluminum ethoxide, diisobutyl aluminum ethoxide, and diisobutyl aluminum phenoxide; and dialkyl aluminum hydride such as dimethyl aluminum hydride, diethyl aluminum hydride, dipropyl aluminum hydride, and diisobutyl aluminum hydride.

Preferable among them is trialkyl aluminum, particularly triethyl aluminum and triisobutyl aluminum. The trialkyl aluminum can be used in combination with the other organoaluminum compound such as commercially available diethyl aluminum chloride, ethyl aluminum dichloride, ethyl aluminum sesquichloride, diethyl aluminum ethoxide, and diethyl aluminum hydride, and a mixture or complex thereof.

In addition, the organoaluminum compound may be used alone or in combination with an electron donor compound. Any electron donor compound used in the preparation of the catalyst component of this invention may be used. Preferable ones are carboxylic acid esters, alcohols, ethers, and ketones. The electron donor compound may be used when an organoaluminum compound is used in combination with the catalyst component, or may be used after being contacted with an organoaluminum beforehand.

The organoaluminum compound is used in an amount of 1 to 2000 gram mol, preferably 20 to 500 gram mol, for 1 gram atom of titanium in the catalyst component.

The ratio of the organoaluminum compound to the electron donor compound is such that aluminum in the organoaluminum compound is 0.1 to 40 gram atom, preferably 1 to 25 gram atom, for 1 mol of the electron donor compound.

Polymerization of Olefin

The catalyst composed of the catalyst component prepared as mentioned above and an organoaluminum compound (and an electron donor compound) is useful as a catalyst for homopolymerization of a monoolefin or copolymerization of a monoolefin and other monoolefin or diolefin. It exhibits outstanding performance as a catalyst for homopolymerization of an alpha-olefin of carbon number 3 to 6, such as propylene, 1-butene, 4-methyl-1-pentene, and 1-hexene, or random or block copolymerization of the above-mentioned alpha-olefins with one another or with ethylene; and for homopolymerization of ethylene or random or block copolymerization of ethylene with an alpha-olefin of carbon number 3 to 10, such as propylene, 1-butene, 4-methyl-1-pentene, 1-hexene, and 1-octene.

The polymerization may be performed either in gas phase or liquid phase. The liquid phase polymerization may be accomplished in an inert hydrocarbon such as n-butane, isobutane, n-pentane, isopentane, hexane, heptane, octane, cyclohexane, benzene, toluene, and xylene, or in the liquid monomer. The polymerization temperature is usually $-80°$ C. to $+150°$ C., preferably $40°$ C. to $120°$ C. The polymerization pressure is 1 to 60 atm. The molecular weight modification of the resulting polymer is accomplished in the presence of hydrogen or other known molecular weight modifiers. In the copolymerization of olefin, the quantity of other olefin to be copolymerized is usually less than 30 wt %, particularly 0.5 to 15 wt %, based on the olefin. The polymerization with the catalyst system of this invention may be performed continuously or batchwise under the commonly used conditions. The copolymerization may be accomplished in one step or in two or more steps.

EFFECT OF INVENTION

The catalyst component of this invention is useful for the production of polyolefins, particularly isotactic polypropylene, ethylene-propylene random copolymer, and ethylene-propylene block copolymer.

The polymerization catalyst made from the catalyst component of this invention exhibits a high catalytic activity and stereoregularities and keeps its high activity for a long time. It provides polymer powder having a high bulk density and flowability.

EXAMPLES

The invention is described in more detail with reference to the following examples and application examples. The scope of this invention is not limited by these examples. Percent (%) in the examples and application examples means wt %, unless otherwise indicated.

The specific surface area (S.A.) and pore volume (P.V.) of the catalyst component were measured by using SORPTOMATIC, Model 1810, made by CARLO ERBA.

The catalytic activity Kc is the quantity (g) of polymer formed per 1 g of catalyst, and Kt is the quantity (kg) of polymer formed per 1 g of titanium in the catalyst.

The heptane insoluble (referred to as HI hereinafter) which indicates the ratio of crystalline fractions in the polymer is the quantity of residues which remain after extraction for 6 hours with boiling n-heptane in a Soxhlet apparatus of improved type.

The melt flow rate (MFR) and melt index (MI) were measured according to ASTM-D1238. The bulk density was measured according to ASTM-D1895-69, Method A.

EXAMPLE 1

Contacting of Magnesium Diethoxide with Trichlorosilane

Into a 2-liter glass reactor equipped with a reflux condenser, dropping funnel, and stirrer and replaced with nitrogen were charged 120 g (1.05 mol) of commercial magnesium diethoxide and 680 ml of n-heptane. With stirring at room temperature, a mixture of 356 g (2.63 mol) of trichlorosilane and 250 ml of n-heptane was added dropwise from the dropping funnel over 45 minutes. Stirring was continued for 6 hours at 70° C. During the reaction, a gas composed mainly of ethylene and ethyl chloride formed. The resulting solids were filtered off at 70° C. and then washed by stirring in 600 ml of n-hexane at 65° C. for 10 minutes. The supernatant liquid was removed by decantation. Washing with n-hexane was repeated 4 times, and the solids were dried at 60° C. for 1 hour under reduced pressure. Thus there was obtained 177 g of solid component (I). This solid component was found to contain 12.7% of magnesium, 14.2% of silicon, and 46.0% of chlorine, and to have a specific surface area of 25 m$^2$/g and a pore volume of 0.06 cc/g.

Contacting with Ethyl Benzoate 15 g of the solid component (I) was placed in a 300-ml stainless steel (SUS316) mill pot containing 100 pieces of stainless steel (SUS316) balls, 12 mm in diameter, under the nitrogen atmosphere. Then 3.8 g of ethyl benzoate was added to the mill pot. The mill pot was mounted on a shaker and shaken for 1 hour for crushing. Thus there was obtained a solid component (II).

Contacting with Titanium Tetrachloride and Silicon Tetrachloride 7 g of the solid component (II) was placed in a 200-ml glass reactor equipped with a stirrer under the nitrogen atmosphere. Then 40 ml of toluene and 60 ml of titanium tetrachloride were added, followed by stirring at 90° C. for 2 hours. The supernatant liquid was removed by decantation. 85 ml of toluene and 6.3 g of silicon tetrachloride were added, and contacting was accomplished at 60° C. for 1 hour. After washing 4 times with 90 ml portions of toluene at 60° C., 40 ml of toluene and 60 ml of titanium tetrachloride were added, followed by stirring at 90° C. for 2 hours. The resulting solid substance was filtered off at 90° C.. After washing 7 times with 90 ml portions of n-hexane at room temperature, the solids were dried at room temperature for 1 hour under reduced pressure. Thus there was obtained 4.4 g of catalyst component containing 2.5% of titanium, 17.5% of magnesium, 55.8% of chlorine, 3.8% of silicon, and 12.4% of ethyl benzoate. The catalyst component was found to have a specific surface area of 265 m$^2$/g and a pore volume of 0.22 cc/g.

EXAMPLES 2 TO 5

Catalyst components were prepared in the same way as in Example 1, except that silicon tetrachloride was replaced by tin tetrachloride (Example 2), antimony pentachloride (Example 3), aluminum trichloride (Example 4), and boron trichloride (Example 5). Table 1 shows the compositions of the the resulting catalyst components.

EXAMPLES 6 AND 7

Catalyst components were prepared in the same way as in Example 1, except that ethyl benzoate used for contacting with the solid component (I) was replaced by benzoic anhydride (Example 6) and benzoyl chloride (Example 7). Table 1 shows the resulting catalyst components.

EXAMPLES 8 TO 11

Catalyst components were prepared in the same way as in Example 2, except that trichlorosilane used for the contacting of magnesium diethoxide was replaced by methyldichlorosilane (Example 8), diemethylchlorosilane (Example 9), triethylsilane (Example 10), and diethoxymethylsilane (Example 11). Table 1 shows the compositions of the resulting catalyst components.

COMPARATIVE EXAMPLE 1

Into the same mill pot as used in Example 1 were charged under the nitrogen atmosphere 31.5 g of commercial magnesium diethoxide and 7.5 ml of ethyl benzoate. The mill pot was shaken on a shaker for 15 hours.

9.2 g of the resulting ground solid was placed in a 200-ml glass container equipped with a stirrer, and 40 ml of toluene and 60 ml of titanium tetrachloride were added. The reactants were stirred at 90° C. for 2 hours. The resulting solid substance was filtered off at 90° C. and washed 7 times with 90 ml portions of n-hexane at room temperature. The solid substance was dried at room temperature for 1 hour under reduced pressure. Table 1 shows the compositions of the resulting catalyst component.

COMPARATIVE EXAMPLE 2

Into a 500-ml glass container equipped with a stirrer were charged 5.3 g of the ground solid obtained in Comparative Example 1 and then 330 ml of n-heptane. Then, 9 ml of titanium tetrachloride was added dropwise at room temperature over 15 minutes, and then 35 ml of trichlorosilane was added dropwise in the same manner as above. The reactants were stirred at 90° C. for 2 hours.

The resulting solid substance was filtered off at 90° C. and washed 6 times with 150 ml portions of n-hexane at room temperature. The solid substance was dried at room temperature for 1 hour under reduced pressure. Table 1 shows the compositions of the resulting catalyst component.

TABLE 1

| | Silicon Compound-treated Solid Composition (%) | | | Catalyst Component Composition (%) | | | |
| --- | --- | --- | --- | --- | --- | --- | --- |
| | Mg | Si | Cl | Mg | Ti | Si | Cl |
| Example | | | | | | | |
| 1 | 12.7 | 14.2 | 46.0 | 17.5 | 2.5 | 3.8 | 55.8 |
| 2 | 12.7 | 14.2 | 46.0 | 17.2 | 2.4 | 3.5 | 56.2 |
| 3 | 12.7 | 14.2 | 46.0 | 18.4 | 2.3 | 3.1 | 59.5 |
| 4 | 12.7 | 14.2 | 46.0 | 17.8 | 2.3 | 2.9 | 60.3 |
| 5 | 12.7 | 14.2 | 46.0 | 18.2 | 2.6 | 3.4 | 57.8 |
| 6 | 12.7 | 14.2 | 46.0 | 16.8 | 2.8 | 2.8 | 55.8 |
| 7 | 12.7 | 14.2 | 46.0 | 16.2 | 3.0 | 3.0 | 56.3 |
| 8 | — | 13.8 | — | 16.8 | 2.5 | 3.8 | 56.5 |
| 9 | — | 14.0 | — | 17.4 | 2.5 | 3.1 | 58.2 |
| 10 | — | 12.8 | — | 17.8 | 2.6 | 3.4 | 58.8 |
| 11 | — | 13.9 | — | 18.1 | 2.3 | 2.7 | 59.2 |
| Comparative Example | | | | | | | |
| 1 | — | — | — | 16.8 | 5.8 | — | 59.1 |

TABLE 1-continued

| | Silicon Compound-treated Solid Composition (%) | | | Catalyst Component Composition (%) | | | |
|---|---|---|---|---|---|---|---|
| | Mg | Si | Cl | Mg | Ti | Si | Cl |
| 2 | — | — | — | 14.3 | 5.9 | 0.6 | 42.6 |

APPLICATION EXAMPLE 1

Polymerization of Propylene 19.2 mg of catalyst component obtained in Example 1, 2.5 ml of triethyl aluminum (abbreviated as TEAL hereinafter) solution in n-heptane, nd 0.38 ml of ethyl p-methoxybenzoate were mixed. After standing for 5 minutes, the mixture was added to a 1.5-liter stainless steel (SUS 32) autoclave equipped with a stirrer under the nitrogen atmosphere. (The n-heptane solution of TEAL contains 1 mol of TEAL in 1 liter of n-heptane, and 2.5 ml of the solution corresponds to 250 gram atom of aluminum for 1 gram atom of titanium in the catalyst component. 0.38 ml of ethyl p-methoxybenzoate corresponds to 0.33 mol for 1 gram atom of aluminum in TEAL.) Then, 0.6 liter of hydrogen as the molecular weight modifier and 0.8 liter of liquified propylene were forced into the autoclave. The reaction system was heated to 70° C., and the polymerization of propylene was carried out for 1 hour. After the polymerization was complete, unreacted propylene was purged. Thus there was obtained 311.0 g of white polypropylene powder having an HI of 96.0% (heptane insolubles indicating the crystalline fraction in the polymer), an MFR of 1.9 (melt flow rate), and a bulk density of 0.39 g/cm$^3$.

Kc = 16,200 [quantity (g) of polymer formed per 1 g of catalyst]

Kt = 648 [quantity (kg) of polymer formed per 1 g of Ti in the catalyst]

APPLICATION EXAMPLES 2 TO 13

Polymerization of propylene was carried out in the same way as in Application Example 1, except that the catalyst component obtained in Example 1 was replaced by those which were obtained in Examples 2 to 11 and Comparative Examples 1 and 2. The results are shown in Table 2.

TABLE 2

| Application Example | Catalyst Component | Kc (g) | Kt (kg) | MFR HI (%) | Bulk (g/10 min) | density (g/cm$^3$) |
|---|---|---|---|---|---|---|
| 1 | Example 1 | 16,200 | 648 | 96.0 | 1.9 | 0.39 |
| 2 | Example 2 | 15,900 | 663 | 95.9 | 2.5 | 0.38 |
| 3 | Example 3 | 14,300 | 662 | 95.8 | 1.8 | 0.40 |
| 4 | Example 4 | 16,000 | 696 | 95.8 | 2.7 | 0.39 |
| 5 | Example 5 | 15,200 | 585 | 95.1 | 3.2 | 0.39 |
| 6 | Example 6 | 13,800 | 493 | 95.1 | 3.0 | 0.37 |
| 7 | Example 7 | 14,200 | 473 | 94.8 | 2.8 | 0.37 |
| 8 | Example 8 | 14,900 | 596 | 95.8 | 2.1 | 0.39 |
| 9 | Example 9 | 15,100 | 604 | 95.6 | 2.8 | 0.37 |
| 10 | Example 10 | 15,300 | 588 | 96.1 | 2.0 | 0.38 |
| 11 | Example 11 | 14,500 | 630 | 95.7 | 3.2 | 0.39 |
| 12 | Comparative Example 1 | 6,200 | 107 | 92.9 | 5.4 | 0.34 |
| 13 | Comparative Example 2 | 600 | 10 | 85.1 | — | — |

What is claimed is:

1. A process for the polymerization of olefins which comprises homopolymerizing ethylene or an alpha-olefin or copolymerizing an alpha-olefin with another alpha-olefin or with ethylene in the presence of a catalyst system comprising
   (A) a titanium halide containing catalyst component for the polymerization of olefins obtained by (1) reacting (a) Mg(OR)(OR') with (b) a silicon compound having at least one silicon-hydrogen bond, (2) contacting the reaction product with (c) an electron donor compound, (3) contacting the resulting contact product two or more times with a titanium halide, and (4) between at least one of the multiple titanium halide contacts, contacting the titanium halide contacted solid with a halide of an element selected from the group consisting of elements of Groups IIIa, IVa, and Va of the Periodic Table, wherein R and R' are radicals selected from alkyl, alkenyl, cycloalkyl, aryl and aralkyl radicals and R and R' may be the same or different
   (B) and an organoaluminum cocatalyst.

2. The process in accordance with claim 1 wherein the reaction productobtained from step (3) is contacted with the titanium halide two times and the metal halide employed between the two titanium halide contact steps is selected from the group consisting of BCl$_3$, BBr$_3$, BI$_3$, AlCl$_3$, AlI$_3$, AlBr$_3$, GaCl$_3$, GaBr$_3$, InCl$_3$, TiCl$_3$, SiCl$_4$, SnCl$_4$, SbCl$_5$, and SbF$_5$.

3. The process in accordance with claim 1 wherein the electron donor compound is one of carboxylic acids esters, carboxylic acid anhydrides, carboxylic acid halides, alcohols, and ethers.

4. The process in accordance with claim 1 wherein the titanium halide is titanium tetrachloride.

5. The process in accordance with claim 4 wherein R and R' are alkyl radicals having from 1 to 8 carbon atoms, the silicon compound is a hydrosilane, the electron donor is an alkyl ester of an aromatic carboxylic acid and the metal halide is selected form the group consisting of SiCl$_4$, SnCl$_4$, AlCl$_3$, and BCl$_3$.

6. The process in accordance with claim 5 wherein R and R' are ethyl.

7. The process in accordance with claim 6 wherein the hydrosilane is trichlorosilane.

8. The process in accordance with claim 1 wherein propylene is homopolymerized.

9. The process in accordance with claim 1 wherein propylene is copolymerized with ethylene or another alpha-olefin having from 4 to 10 carbon atoms.

* * * * *